(12) United States Patent
Chopra et al.

(10) Patent No.: US 10,838,912 B1
(45) Date of Patent: Nov. 17, 2020

(54) INTELLIGENT SELECTION OF BACKUP LEVELS

(71) Applicant: EMC IP Holding Company LLC, Hopkinton, MA (US)

(72) Inventors: Shelesh Chopra, Bangalore (IN); Ajith Gopinath, Bangalore (IN); Harsh Sharma, Bangalore (IN); Hareej G Hebbur, Bengaluru (IN); Chetan Battal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 328 days.

(21) Appl. No.: 15/727,346

(22) Filed: Oct. 6, 2017

(51) Int. Cl.
  *G06F 16/11* (2019.01)
  *G06F 7/535* (2006.01)
  *G06F 16/23* (2019.01)
  *G06F 11/14* (2006.01)

(52) U.S. Cl.
  CPC .......... *G06F 16/113* (2019.01); *G06F 7/535* (2013.01); *G06F 11/1451* (2013.01); *G06F 11/1458* (2013.01); *G06F 16/122* (2019.01); *G06F 16/23* (2019.01)

(58) Field of Classification Search
  CPC ................ G06F 11/1458; G06F 11/1451
  See application file for complete search history.

(56) References Cited

U.S. PATENT DOCUMENTS 8,260,750 B1 * 9/2012 Gugick ............... G06F 11/1451
                                                            707/645
9,720,783 B1 * 8/2017 Kulkarni ............. G06F 11/1461

* cited by examiner

*Primary Examiner* — William Spieler
(74) *Attorney, Agent, or Firm* — Staniford Tomita LLP (57) ABSTRACT

A rule specifies a data change percent and a backup level to use corresponding to the data change percent. The backup level may be a full backup or a non-full backup. Before backing up a source for an impending backup, a percent of data change of the source from a last backup of the source to the impending backup is calculated. The rule is evaluated against the calculated percent change to select a backup level for the impending backup. Based on the evaluation, the full backup level or non-full backup level is selected and the source is backed up according to the selected backup level.

18 Claims, 6 Drawing Sheets

INTELLIGENT SELECTION OF BACKUP LEVELS

TECHNICAL FIELD

Embodiments are generally directed to data protection, and more specifically to intelligently selecting a backup level to use for a backup.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Backing up refers to the copying of data (e.g., physical or virtual files or databases) to a secondary site for preservation in case of equipment failure or other catastrophe. There can be several types of backups including full, differential, and incremental. A full backup is a complete copy of all data. An incremental backup involves copying only changes since a last backup. A differential backup involves copying changes since a last full backup.

"Forever incremental" refers to a data protection approach in which there is an initial full backup and then an ongoing (e.g., "forever") sequence of incremental backups. Incremental backups can seem attractive because an incremental backup copies only that which has changed since a last backup. Thus, incremental backups can be very storage efficient and can also limit the amount of data transmitted over a network to backup storage.

Performing an incremental backup, however, may require a large amount of compute resources to process the changes. Further, restoring may require processing each incremental one-by-one because each incremental depends on a preceding incremental.

As a result, incremental backups may not always be the most efficient approach in all situations for all enterprises. There is a need to be able to intelligently and automatically select an appropriate backup level to use for a particular backup.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a non-transitory computer-usable medium having a computer-readable program code embodied therein. In the context of this disclosure, a non-transitory computer-usable medium or computer-readable medium may be any physical medium that can contain or store the program for use by or in connection with the instruction execution system, apparatus or device. For example, the non-transitory computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer (e.g., processor of the computer), the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for the intelligent and dynamic selection of backup levels. In an embodiment, a backup level such as a full backup, incremental backup, or differential backup is automatically selected for an impending backup based on measuring a degree of data change from a last backup to the impending backup. The impending backup may be referred to as a current, present, forthcoming, approaching, or upcoming backup. In other words, the impending backup has not yet occurred. Depending upon the data change, one level of backup may be more or less efficient than another level of backup in regards to recovery time objectives (RTO), required backup time, other factors, or combinations of these. In an embodiment, the system automatically selects an appropriate backup level for a backup at a time of the backup.

A "forever incremental" refers to a data protection technique where the initial backup is a full backup and, afterwards, there is an ongoing (e.g., "forever") sequence of incremental backups. An incremental backup is a type of backup in which only that which has changed (or is new) since a last backup is backed up and stored. The forever incremental technique is attractive because it may reduce backup window times, conserve computing resources on the backup clients and servers, reduce the amount of data transmitted across the network, and reduce the amount of data stored on backup storage.

Nonetheless, there can be situations where an incremental backup may not necessarily be the most efficient approach. It is desirable that the backup application have intelligence to differentiate and compare the gain versus inefficiencies of any backup models. For example, when incremental backup operations involve copying to legacy backup devices, there can be situations where the forever incremental technique may seriously compromise RTO objectives. Based on the pattern, the user may be better served with a full backup or differential backup in between incremental backups.

Tests have been conducted that use certain backup systems to perform incremental backups of virtual machines (VMs) including Hyper-V VMs. Hyper-V is a virtualization platform provided by Microsoft Corporation of Redmond, Wash. While in some cases forever incremental backups for Hyper-V reduces the backup time, there can be different impacts to the RTO based on the type of backup performed and in some cases there can be a dramatic increase in RTO. It should be appreciated that while some embodiments are shown and described in conjunction with Hyper-V, aspects and principles of the system can be applicable to backing up other applications and data sources (e.g., SQL Server, Exchange database, Oracle database, and others).

Table A below shows some sample test results of times required to perform full and incremental backups of multiple Hyper-V VMs and restore from full and incremental backups.

TABLE A

| Operation and Number of VMs | Time |
| --- | --- |
| Full Backup (30 VM Hyper-V) | 60 minutes |
| Restore from Full Backup (30 VM Hyper-V) | 1 hour and 10 minutes |
| Restore from Incremental Backup (30 VM Hyper-V) | 1 hour and 42 minutes |
| Full Backup (60 VM Hyper-V) | 100 minutes |
| Incremental Backup (60 VM Hyper-V) | 2 hours and 30 minutes |
| Incremental Backup (60 VM Hyper-V) | 3 hours and 42 minutes |

The sample test data in table A above illustrates that in some cases the time required to complete an incremental backup may be even longer than the time required to complete a full backup. This can occur when, for example, there is a large increase in the amount of data to be backed up between backup intervals (e.g., 70 percent change or more) as an incremental backup may require additional processing and calculations regarding change block calculations, overwrite values, and so forth. In these scenarios, it may be advantageous to instead perform a full backup of the source volume, disk, or virtual hard disk.

Figure 1:
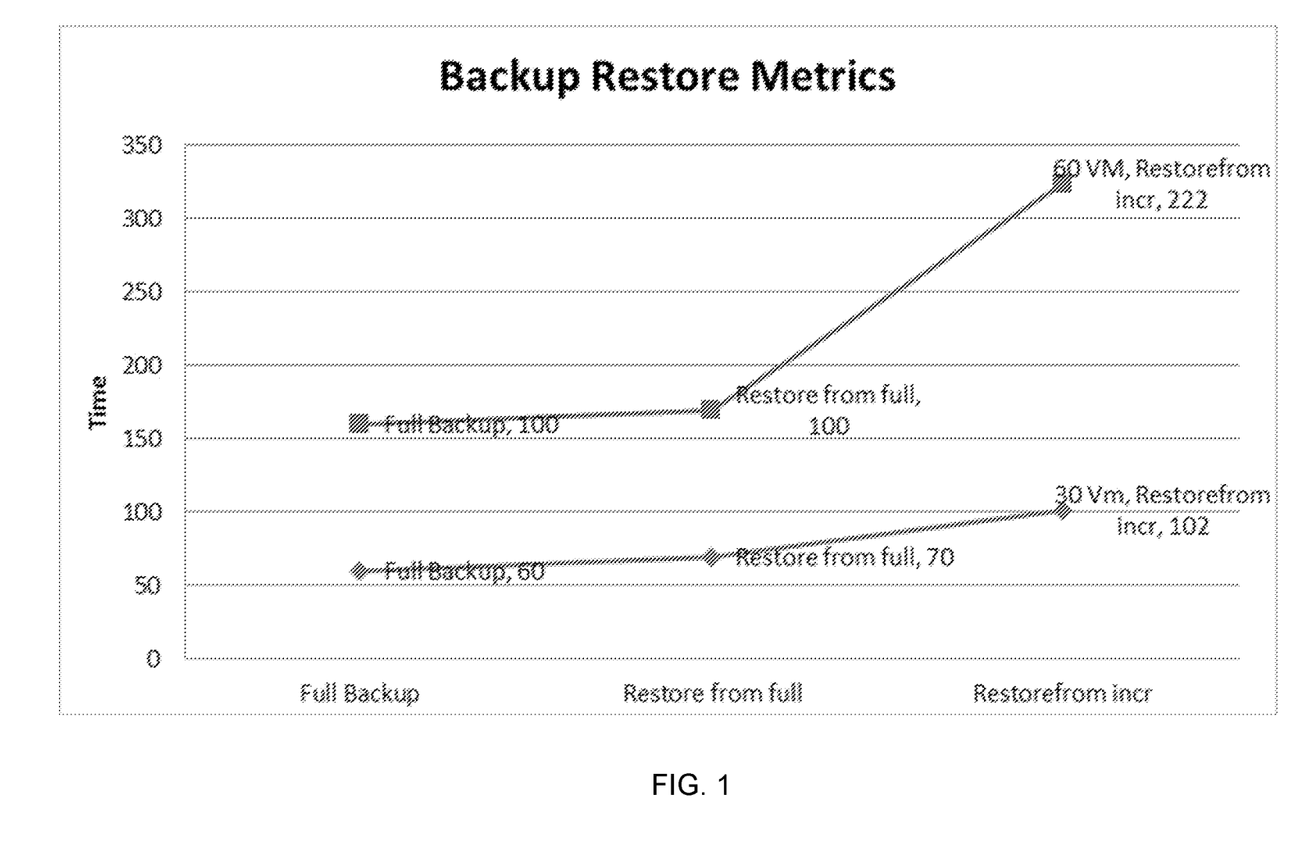
FIG. 1 shows a graph of backup restore metrics.

FIG. 1 shows a graph illustrating backup and restore metrics. The graph shows the backup-recovery trend when forever incremental backups are employed in various scenarios. A y-axis of the graph indicates time. An x-axis of the graph indicates restores using full and incremental backups. As shown in the graph, the RTO time for the applications in these test cases increase with the use of incremental backups.

It would be desirable to provide improved systems and techniques to automatically select the appropriate backup level rather than merely provide a manual user selection which can become counter-productive. In a specific embodiment, systems and techniques are provided that validate whether it would be productive to conduct a full backup, differential backup, or incremental backup based on patterns and not simply employ static selection algorithms. Some disadvantages of current techniques include having static selection algorithms that are not necessarily efficient in all situations. Counter-productive solutions lead to higher Total Cost of Ownership (TCO) and add risk to the Service Level Objectives (SLO). As shown in the example of FIG. 1, under certain scenarios, RTOs may increase drastically which can lead to business discontinuities. A static algorithm does not include intelligence and can lead to major implications later.

Figure 2:
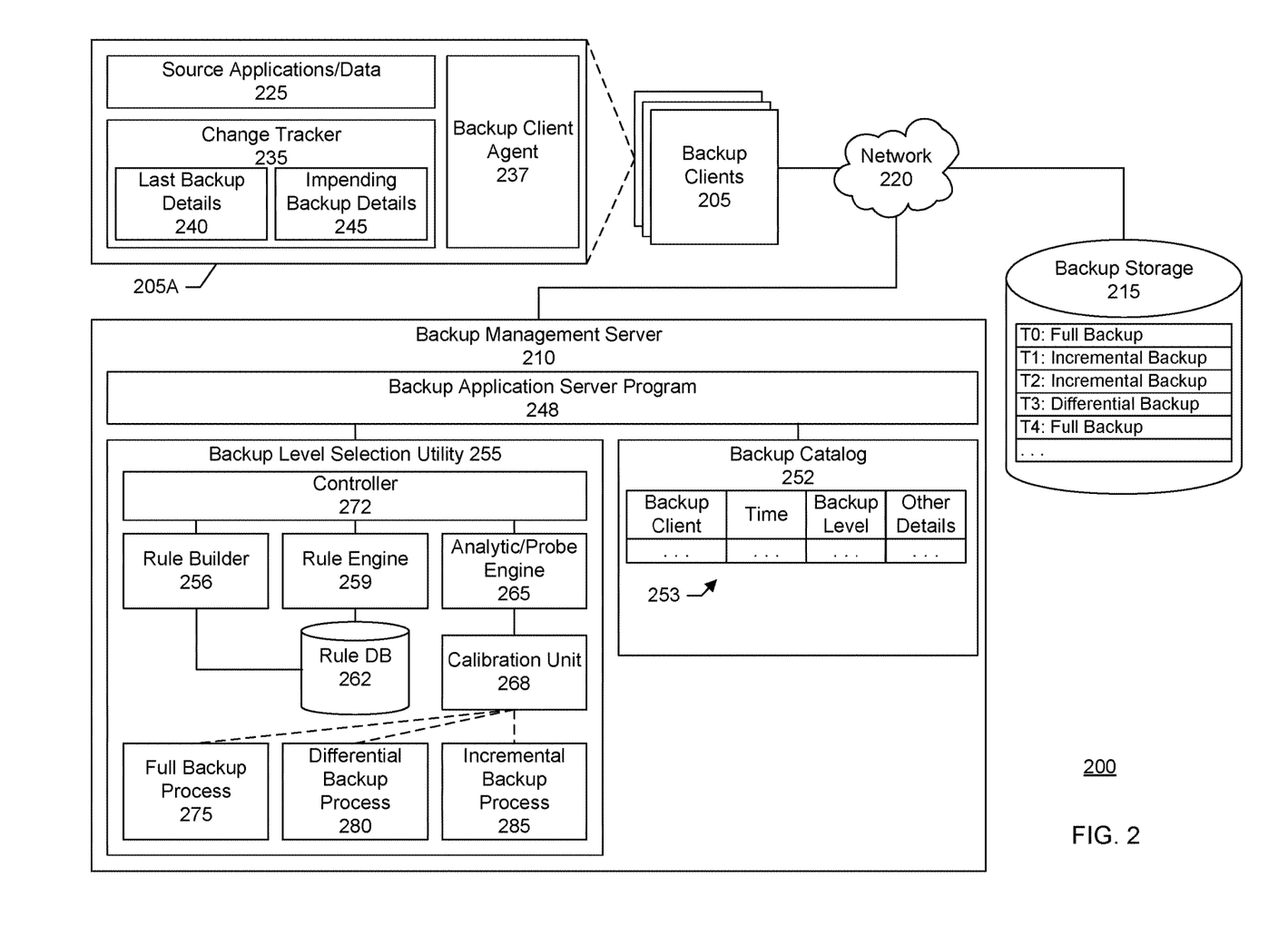
FIG. 2 is a diagram of a large-scale network implementing a system that intelligently selects a backup level for a backup, under some embodiments.

FIG. 2 illustrates a simplified block diagram of a computing environment 200 that implements one or more embodiments of a system to intelligently and dynamically select a backup level for an impending backup. In a specific embodiment, there is a rule engine that helps to determine whether an impending backup operation should be performed as a full backup, differential backup, or incremental backup based on factors including the applications or other source of data to be backed up and the respective needs of the enterprise such as recovery point objectives (RPO), recovery time objectives (RTO), other factors, or combinations of these. Based on the rules and their respective expectations, the backup application automatically decides which of the different available backup levels to use for the backup. In an embodiment, the rule engine creates rules schema/DB that can be updated such as by a vendor of the backup application, an end user (e.g., backup administrator), or both.

The environment shown in FIG. 2 includes any number of clients 205, a backup management server 210, and a backup storage repository 215, each of which are interconnected by a network 220.

The network provides connectivity to the various systems, components, and resources of the distributed computer network shown in FIG. 2. The network may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 200 may be stored in a backup media of the backup storage repository. The backup media may be located at any number of persistent storage locations and devices, such as local client storage, server storage, or network storage, which may at least be partially implemented through storage device arrays, such as RAID components. In an embodiment, network 220 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

In an embodiment, system 200 may represent a Data Domain Restorer (DDR)-based deduplication storage system, and the backup storage server having backup media may be implemented as a DDR Deduplication Storage server provided by Dell EMC of Hopkinton, Mass. However, other similar backup and storage systems are also possible. System 200 may utilize certain protocol-specific namespaces that are the external interface to applications and include NFS (network file system) and CIFS (common internet file system) namespaces, as well as a virtual tape library (VTL) or DD Boost provided by Dell EMC. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 200 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

The clients and servers can be general purpose computers with software and hardware. The hardware may include a processor, memory, storage (e.g., hard disk), input/output (I/O) controller, network interface, display or electronic screen, input device, and other computing components, each of which may be interconnected by a bus architecture or any interconnection scheme. The software may include an operating system, application programs, services, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface or application program interface (API) or messaging system.

A client may be referred to as a backup client, host, host computer, or node. A client, such as a client 205A, may store source data or host any number of source applications 225 including virtual machines that are to be backed up (e.g., copied to backup storage). Examples of source data/applications that may be backed up include databases, virtual machines, virtual hard disks, files, directories, documents, media, and the like. A virtual machine is a software abstraction of a physical computing machine. A client host uses virtualization software to create and host any number of virtual machines. A client host may host dozens, hundreds, or even thousands of virtual machines.

The client may further include a change tracker 235 and backup application client agent 237. The change tracker may be referred to as a changed block tracker (CBT) and is responsible for tracking changes to a volume associated with the client. In a specific embodiment, the CBT is a driver and may be integrated with an operating system of the client or positioned between a file system of the client and operating system. The CBT driver is responsible for intercepting writes to the volume and tracking changes at the block-level to the volume. Such changes may include blocks that are overwritten, blocks that are new, or both. The CBT driver monitors these changes in the background so that these blocks can be backed up in a next backup.

Specifically, the CBT driver tracks writes issued by the application through the file system to the volume or virtual hard disk. The CBT driver records the block locations or other identifiers for blocks that have changed since a previous or last backup. In other words, the CBT driver monitors the file system for changes to blocks between backup intervals. The changed blocks may be listed or otherwise identified in a changed block list or log. For example, a set of changed blocks may be identified by its starting block location (e.g., offset) and length. The changed block list may include a bitmap having a bit for each block of the volume. When a block is changed, a value for a bit corresponding to the block may be set, flagged, or otherwise marked to indicate that the block changed.

The changed block list may be stored locally at the client such as in-memory or on disk. The changed block list may be transmitted from the client to the backup management server. In a specific embodiment, when the time for a backup has arrived, the backup application server program instructs the backup application client agent to perform a backup. In the case of an incremental backup, the backup application client agent may obtain from the CBT driver a listing of blocks that have changed since a previous backup. The backup client agent can review the list and select those changed blocks that should be read and transmitted to the backup storage server during the backup. During an initial backup of the file system, all blocks may be read and transmitted for backup. The CBT may then begin tracking the blocks for the subsequent backups. During a next incremental backup only blocks that have changed since a previous or last backup according to the CBT may be transmitted to the backup management server (or backup storage repository).

As discussed above, however, an incremental backup may not necessarily provide good performance in all cases. For example, to assist with incremental backups, Hyper-V facilitates the creation of checkpoints (also referred to as snapshots) to collect changes and I/Os. During an incremental backup, a new child checkpoint is created for current changes and the parent checkpoint is backed up. When the backup is complete, the child and parent checkpoint are merged leaving the new combined checkpoint. The combined checkpoint is used as the new parent for a next backup.

In cases where the checkpoint to be backed up in the incremental backup includes a large amount of data (e.g., many changes), problems have been observed with the backup including lengthy processing times, timeouts, stale checkpoints (e.g., snapshots that have not been properly cleaned up and removed), incomplete restorations, lengthy restoration times due to processing many large incremental backups, environment stability, and other issues. Conducting a full backup operation in these cases can help to avoid such problems and issues. A full backup operation can include the parent checkpoint and also the state and configuration of the virtual machine that may not be included in an incremental backup.

In a specific embodiment, the change tracker maintains details of a last backup 240 and obtains details of an impending backup 245. Instead or additionally, the details may be transmitted from the client to a central server (e.g., backup management server). The details of the last backup may include a count of a number of blocks backed up during the last backup, a size of the last backup (e.g., number of bytes), an identification of files backed up during the last backup, or combinations of these. The number of blocks in a backup may be obtained by reviewing the changed block list and counting the number of blocks that have been flagged or otherwise identified as having been changed.

The details for an impending backup may similarly include a count of a number of blocks to be backed up during the impending backup, a size of the impending backup (e.g., number of bytes), an identification of files to be backed up during the impending backup, or combinations of these.

The backup storage repository stores the data backed up (e.g., copied) from the various clients. As shown in the example of FIG. 2, in an embodiment, an initial backup of a particular data source at a time T0 includes a full backup. A backup at a time T1, after time T0, includes an incremental backup. A backup at a time T2, after times T0 and T1, includes an incremental backup. A backup at a time T3, after times T0, T1, and T2, includes a differential backup. A backup at a time T4, after times T0, T1, T2, and T3, includes a full backup.

The full backup includes a complete copy of data on the source as of time T0. Thereafter, depending on an evaluation of the backup level selection rules there can be any number of incremental backups, differential backups, or full backups. As discussed, a full backup copies all the source client data to the backup storage repository. An incremental backup copies only data that has changed since a last backup (which may be a full backup, incremental backup, or differential backup). In other words, an incremental backup may include only changes or new data that have not yet been backed up. A differential backup copies everything that has changed or is new since a last full backup.

Figure 3:
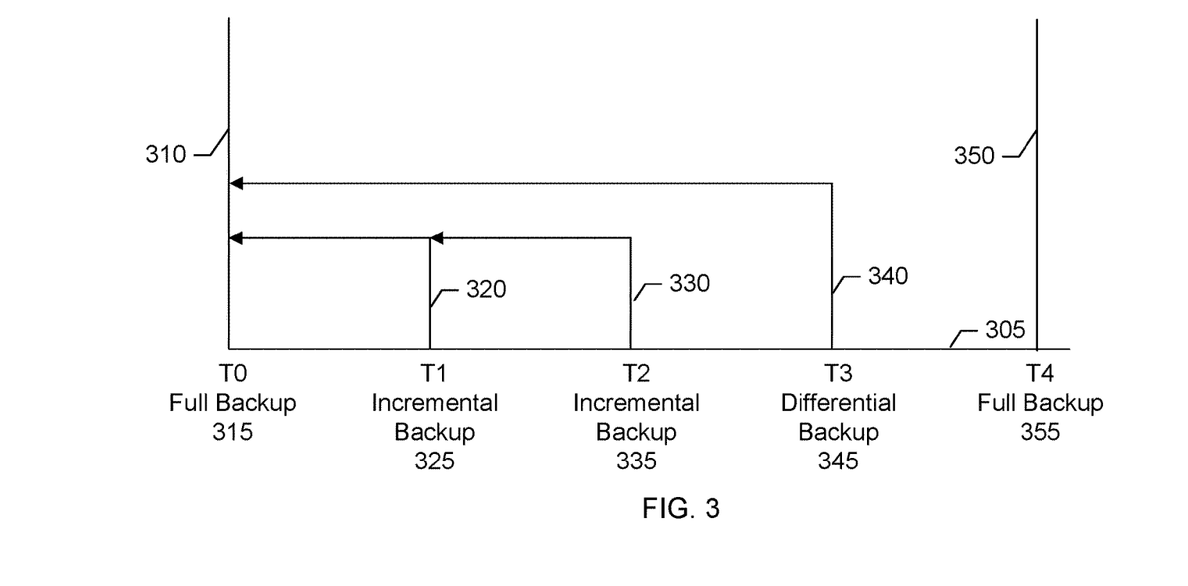
FIG. 3 shows a schematic representation of full, incremental, and differential backups.

For example, FIG. 3, shows a timeline representation of the different backup levels shown in FIG. 2. In FIG. 3, a horizontal axis 305 shows backup operations at times T0-T4 and the backup levels used for each backup operation. A line 310 represents a first full backup operation 315 at time T0. In other words, at T0, all blocks on a client source volume may be copied to the backup storage repository. Performing a full backup operation may include copying each block of the volume to backup storage regardless of whether or not a block has changed since a previous backup.

A line 320 represents a first incremental backup operation 325 at T1. Line 320 is shown with an arrow pointing back to a last or previous backup to indicate that the first incremental copies changes since the last backup—which at time T1—is the first full backup. In other words, at T1, only blocks on the client source volume that have changed since the first full backup may be copied to the backup storage repository.

A line 330 represents a second incremental backup operation 335 at T2. Line 330 is shown with an arrow pointing back to a last backup to indicate that the second incremental copies changes since the last backup—which at time T2—is the first incremental backup. In other words, at T2, only blocks on the client source volume that have changed since the first incremental backup may be copied to the backup storage repository.

A line 340 represents a first differential backup operation 345 at T3. Line 340 is shown with an arrow pointing back to a last full backup to indicate that the first differential copies changes since the last full backup—which at time T3—is the first full backup. Thus, the data included in the first differential backup may include changed data and data already existing at the backup storage repository (e.g., data that has previously been copied from the source). In other words, at T3, only blocks on the client source volume that have changed since the first full backup may be copied to the backup storage repository.

A line 350 represents a second full backup operation 355 at T4. Line 350 is shown as a straight line to indicate that the full backup operation copies all source data as of time T4 to the backup storage repository. Thus, the data included in the second full backup may include changed data and data already existing at the backup storage repository. In other words, at T4, all blocks on the client source volume may be copied to the backup storage repository.

Referring back now to FIG. 2, the backup management server includes a backup application server program 248, a backup catalog 252, and a backup level selection utility 255. The backup application server program coordinates with the various backup client agents to backup (and recover) data from the various clients. For example, there can be a predetermined backup schedule maintained by the backup application server program. At a scheduled time, the backup application server program can instruct the relevant client backup agents to begin the backup jobs or operations. Alternatively, a backup may be initiated on-demand by a backup administrator through a management console graphical user interface (GUI) or command line interface (CLI) of the backup application.

The catalog provides an index of the data stored in the backup storage repository. The backed up data may be stored within a logical entity that may be referred to as a saveset. The catalog may include metadata 253 associated with the various backups including a name or identifier of the source, time and date of backup, backup level (e.g., incremental backup, differential backup, or full backup), size of backup, a history of files included in a backup, location of backed up data, other backup details, and so forth. The file history can be used to determine whether or not a particular file (or version of the file) has already been backed up. A comparison or scan of the file history can be conducted to determine whether a file is new or has been backed up previously. If the file is new a full backup of the file may be performed. If the file has been backed up previously, then (in some cases) changes to file may be backed up rather than the entire file.

The backup level selection utility includes a rule builder 256, rule engine 259, rule database 262, analytic probe/engine 265, calibration unit 268, and controller 272 which coordinates the operation of the various components of the backup level selection utility.

The rules builder provides a user interface to create, modify, view, and delete rules. These rules may be stored in the rule database. The rules specify conditions or criteria to be satisfied for performing an incremental backup operation, a differential backup operation, or a full backup operation. In a specific embodiment, the condition includes or specifies a backup change percentage or range of backup change percentages. In an embodiment, a backup change value indicates the degree to which a backup source has changed since a last backup of the source. In other words, the backup change represents the degree of change over a period of time from a time of the last backup of the source to a time of an impending, current, or present backup of the source. In a specific embodiment, the degree of change is a function of the number of blocks on a source volume or disk (e.g., virtual hard disk) that have changed since a last backup. In a specific embodiment, the degree of change is expressed as a percent value or range of percent values. The backup change may be referred to as a backup change rate.

Figure 4:
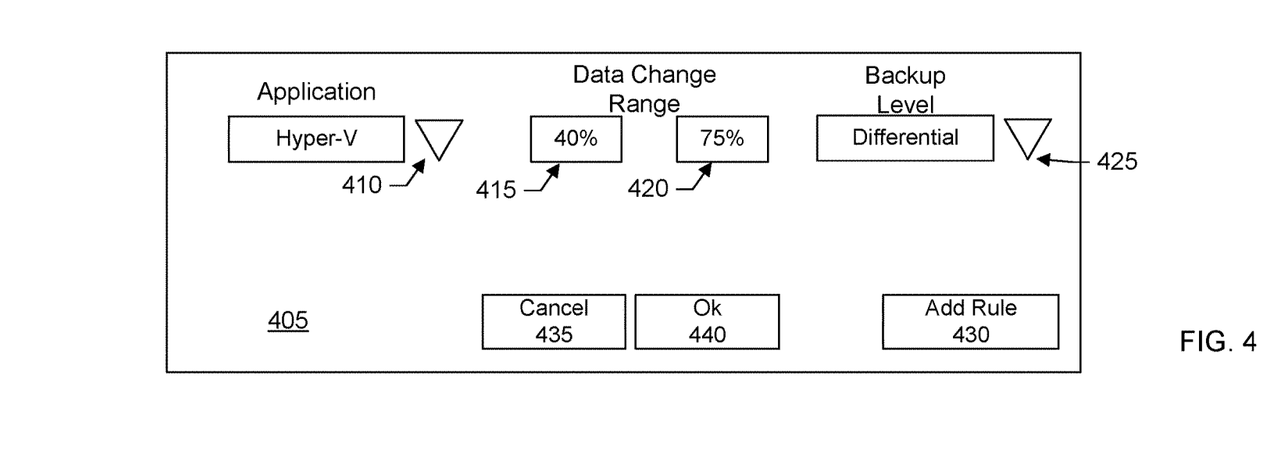
FIG. 4 shows an example of a dialog box to create backup level selection rules, under some embodiments.

FIG. 4 shows an example of a dialog box 405 for configuring the backup level selection rules. The dialog box may be displayed within a graphical user interface (GUI) on an electronic screen of a backup management console. The dialog box includes GUI controls and input boxes that the user can use to create a rule. In the example shown in FIG. 4, there is an application dropdown list 410, data change range input boxes 415 and 420, backup level dropdown list 425, "add rule" button 430, and "cancel" and "ok" buttons 435, 440, respectively.

The application dropdown list includes a listing of applications to be protected. To create a rule, the user selects an application from the dropdown list (e.g., Hyper-V) and specifies a backup change percentage value or range of change percentage values (e.g., upper and lower limit percent changes) and the corresponding backup level to use. The rule builder may provide for the selection of relational operators (e.g., "less than" or "greater than") so that the user may construct various conditional expressions to be evaluated when determining which backup level to use. Additional rules can be created by clicking the "add rule" button. Rules may be saved by clicking the "ok" button or canceled by clicking the "cancel" button.

Table B below shows an example of rules that may be created.

TABLE B

| Application | Backup Change | Backup Level |
|---|---|---|
| Application A | <40% | Incremental |
| Application A | 41%-75% | Differential |
| Application A | >75% | Full |
| Application B | <30% | Incremental |
| Application B | 41%-70% | Differential |
| Application B | >71% | Full |
| ... | ... | ... |

A first column of the table is labeled "Application" identifies an application to which the rule applies. A second column is labeled "Backup Change" and specifies a backup change percentage value or range of backup change percent values. A third column is labeled "Backup Level" and specifies a backup level to be used with the corresponding backup change.

More particularly, the sample rules shown in table A above include first, second, and third rules for application A. The first rule indicates that when the backup change for application A is less than 40 percent, an incremental backup process should be used. The second rule indicates that when the backup change is between 41 percent and 75 percent, a differential backup process should be used. The third rule indicates that when the backup change is greater than 75 percent, a full backup process should be used.

The sample rules shown in table A further include fourth, fifth, and sixth rules for an application B, different from application A. The fourth rule indicates that when the backup change for application B is less than 30 percent, an incremental backup process should be used. The fifth rule indicates that when the backup change is between 41 percent and 70 percent, a differential backup process should be used. The sixth rule indicates that when the backup change is greater than 71 percent, a full backup process should be used.

In a specific embodiment, there can be a set of default rules provided by a vendor of the backup application program. The backup change percentage criteria and corresponding backup level to use may be informed from various tests of the backup application. Such tests may include, for example, testing backing up of various source applications, varying the amount of data changes between backup intervals, measuring the amount of time required to perform the different backup levels, measuring the amount of time to restore from the different backup levels, and so forth.

In a specific embodiment, the rules specify incremental backups when a change of the source corresponds with a first degree; differential backups when the change corresponds with a second degree, greater than the first degree; and full backups when the change corresponds with a third degree, greater than the first and second degrees. There can be a first rule specifying an incremental backup when a degree of change falls within a first range; a second rule specifying a differential backup when the degree of change falls within a second range; and a third rule specifying a full backup when the degree of change falls within a third range. The values in the third range may be greater than the values in the second and first ranges. In other words, each value in the third range may be greater than each value in the second and first ranges. The values in the second range may be greater than the values in the first range. In other words, each value in the second range may be greater than each value in the first range.

In a specific embodiment, an end user is allowed to modify the rules, add new rules, delete rules, and so forth. This allows the end user to customize and tailor the rules to meet the specific needs of their enterprise. For example, a default rule may specify that full backups are to be performed when the backup change exceeds a threshold value of 75 percent. The user may change the default threshold value to a different value (e.g., 60 percent). The user may continually adjust the rules as the needs and available resources of the enterprise change. For example, over time the user may add additional backup storage resources and wish to minimize RTO. In this case, the user may lower a threshold degree of change of a source at which full backups, differential backups, or both are triggered. Thus, full or differential backups of the source may be triggered with fewer changes. Conversely, the user may wish instead to maximize storage efficiency. In this case, the user may raise the threshold degree of change of the source at which full backups, differential backups, or both are triggered which may then result in larger or more frequent incremental backups as compared to full or differential backups.

In an embodiment, a method may include storing a rule specifying a default threshold degree of change for a source and a backup level to be used when a degree of change corresponds to the default threshold degree of change; receiving, from a user, a new threshold degree of change; and setting the default threshold degree of change in the rule to the new threshold degree of change.

Restoring from incremental backups can be a time and resource intensive process when there are many incremental backups to recover because each incremental backup since the last full backup may need to be examined and processed. Thus, if the user's target or destination backup device is relatively slow, the user anticipates there to be frequent restores, or both, the user may wish to lower the threshold value at which full backups are triggered so that there will be fewer incremental backups. Conversely, if the user's target or destination backup device is relatively fast, the user does not anticipate there to be frequent restores, or both, the user may wish to raise the threshold value at which full backups are triggered so that there will be more incremental backups.

The ability to edit the rules allows the backup administrator to adapt the backup strategy to the particular needs of the enterprise and available infrastructure. For example, an enterprise that prioritizes RTO and that is able to provide increased storage space may configure the rules with a low threshold change percent at which full or differential backups are triggered. Conversely, another enterprise that seeks to maximize storage efficiency and is willing to tradeoff potentially longer restoration times may configure the rules with a high threshold change percent at which full or differential backups are triggered.

Referring back now to FIG. 2, the analytic/probe engine is responsible for calculating a degree of change to a source as measured from a time of a last backup of the source to a time of the impending or present backup of the source. There can be a variety of techniques used to find or calculate the backup change for an application such as a Hyper-V.

In a specific embodiment, the system keeps a track of change at an individual object level. In this case, the backup application can keep a track of details for the last backup data and the change at source from the last backup.

In another specific embodiment, the source application to be backed up may provide an intelligent application interface. Certain applications as provided by Oracle, Microsoft, and others may provide a framework of services to assist with a backup. These services may be exposed through an application programming interface (API) that may be accessed by the backup level selection utility.

In a specific embodiment, the backup application is provided with one or more application-specific plugins. For example, there can be an application-specific plugin for backing up Hyper-V virtual machines, another application-specific plugin for backing up SQL Server, another application-specific plugin for backing up an Exchange database, and so forth. These application-specific plugins include the respective logic for interfacing and communicating with the respective specific source applications to be backed up in order to collect the information used to calculate or measure the degree of change since a last backup of the application.

The plugin architecture allows for an efficient and modular design of the backup application. If, for example, the enterprise does not use SQL Server, the plugin for SQL server does not have to be installed in the backup application. Further, different applications may support only certain backup levels. In other words, only certain backup levels will be available for certain applications. For example, some applications may support full backups and incremental backups, but not differential backups. In these cases, the application-specific plugin helps to ensure that a differential backup is not performed on an application that does not support differential backups. Other applications may support all available backup levels including full backups, incremental backups, and differential backups. In these cases, the application-specific plugin is aware of the application's capabilities so that a full backup, incremental backup, or differential backup may be used depending upon the degree of change.

More particularly, commands may be issued by the utility to the API to request the delta change between a last backup and an impending or present time backup. For example, Microsoft Windows provides a copy service referred to as Volume Shadow Copy Service (VSS) which assists in backup operations. The VSS service facilitates the capturing and creation of snapshots from which the backup application can then rollover and copy the data to the backup storage repository. The VSS service helps to ensure, among other things, that the VSS-enabled application is properly quiesced or brought to a consistent state in order to create a snapshot. In an embodiment, the backup selection utility may issue a request to the VSS provider to provide information about the delta change from a last snapshot to a current snapshot for an impending backup. Based on that information, the backup level selection utility decides what backup level to use for the impending backup operation.

In a specific embodiment, the analytic/probe engine gathers an identification of the application to be backed up from the backup application. The analytic/probe engine coordinates with the rule engine to fetch and evaluate the backup level rules relevant to the identified application. The analytic/probe engine then requests, based on the rules evaluation, the calibrator to switch the backup levels on the fly and execute a current backup of the source using a full backup 275, differential backup 280, or incremental backup 285.

For example, an initial backup of a source volume at a time T0 may be conducted as a full backup. When a time arrives for a next backup of the source at a time T1, a degree of change of the source from time T0 to T1 is calculated. One or more rules are evaluated where the rules specify a percent change and backup level to be used corresponding to the percent change. Based on the evaluation, a backup level for the source at time T1 is selected. The source is then backed up in a current backup at time T1 using the selected backup level.

When a time arrives for a next backup of the source at a time T2, the process is repeated. That is, a degree of change of the source from time T1 to T2 is calculated. One or more rules are evaluated where the rules specify a percent change and backup level to be used corresponding to the percent change. Based on the evaluation, a backup level for the source at time T2 is selected. The source is then backed up in a current backup at time T2 using the selected backup level.

When a time arrives for a next backup of the source at a time T3, the process is repeated. That is, a degree of change of the source from time T2 to T3 is calculated. One or more rules are evaluated where the rules specify a percent change and backup level to be used corresponding to the percent change. Based on the evaluation, a backup level for the source at time T3 is selected. The source is then backed up in a current backup at time T3 using the selected backup level. And so forth.

Depending upon the rules and the degree of change between the backup intervals, a series of backups of the source may include a mix of full backups, differential backups, and incremental backups. For example, table C below shows a series of backup operations that may be conducted for a particular application (e.g., Hyper-V).

TABLE C

| Application Name | Number of VMs | Total Backup Size | Backup Change | Backup Level |
|---|---|---|---|---|
| Hyper-V | 100 | 100 GB | 10% | Incremental |
| Hyper-V | 150 | 500 GB | 30% | Incremental |
| Hyper-V | 200 | 1 TB | 40% | Incremental |
| Hyper-V | 150 | 500 GB | 50% | Differential |
| Hyper-V | 200 | 1 TB | 60% | Differential |
| Hyper-V | 150 | 500 GB | 90% | Full |
| Hyper-V | 200 | 1 TB | 75% | Full |

It should be appreciated that the components of the system shown in FIG. 2 can be functional entities where the implementation of the functions may vary. For example, in some cases the rule engine and analytic/probe engine are combined into one code module. In other cases, the components reside in separate code modules.

Figure 5:
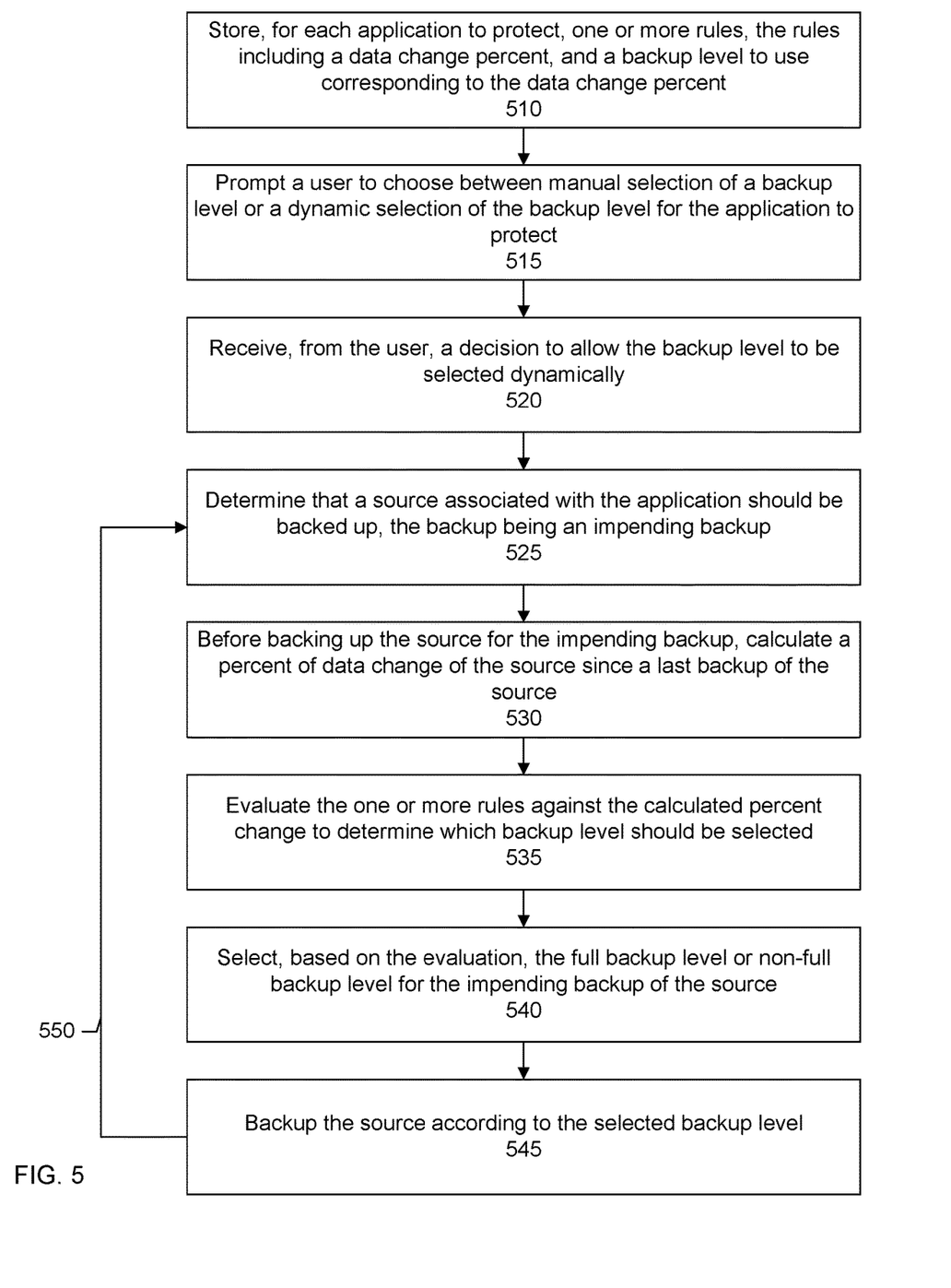
FIG. 5 shows an overall flow of a process for intelligently selecting a backup level for a backup, under some embodiments.

FIG. 5 shows an overall flow of a process for automatically and dynamically selecting a backup level for a backup. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, one or more rules are stored for each application to protect. The rules specify a data change percent (or range of data change percentages) and a backup level to use corresponding to the data change percent. In other words, different rules (having different or the same data change percentages) may be associated with different applications. For example, a first rule associated with a first source application may specify a first range of data change percentages and a corresponding backup level (e.g., full backup) to use when a data change of the first source falls within the first range. A second rule associated with a second source application, different from the first source application, may specify a second range of data change percentages, different from the first range, and the same corresponding backup level (e.g., full backup) to use when a data change range of the second source falls within the second range.

In a step 515, the user is prompted to choose between manual selection of a backup level or a dynamic selection of a backup level for the application to protect. In a specific embodiment, the system provides the user with flexibility to choose. For example, some users may wish to perform only incremental backups (after an initial full backup), regardless of how much changes between backup intervals. Other users, however, may wish to take advantage of the dynamic backup selection algorithm of the backup application.

Figure 6:
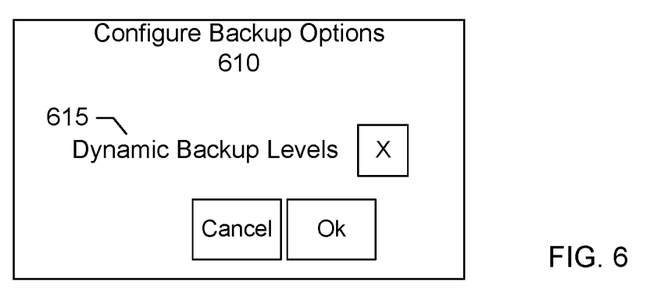
FIG. 6 shows an example of a dialog box to configure dynamic backup levels, under some embodiments.

FIG. 6 shows an example of a dialog box 610 that may be displayed to the user when configuring the backup application. As shown in the example of FIG. 6, the dialog box includes an option 615 for the user to indicate that they would like the backup levels to be dynamically selected.

Referring back now to FIG. 5, in a step 520, the system receives from the user a decision to allow the backup level to be selected dynamically.

In a step 525, the system determines that a source associated with the application should be backed up. This backup may be referred to as an impending backup. The determination may be result of detecting that a prescheduled time for backup has arrived or receiving an on-demand request from the user to perform a backup.

In a step 530, after determining that there should be a backup and prior to or before backing up the source for the impending backup, a calculation is made indicating a degree of change of the source since a last backup of the source. In a specific embodiment, the degree of change is expressed as a percent change. In this specific embodiment, a percent of data change of the source is calculated with respect to a time of a last backup of the source to a current time of the impending backup.

Figure 7:
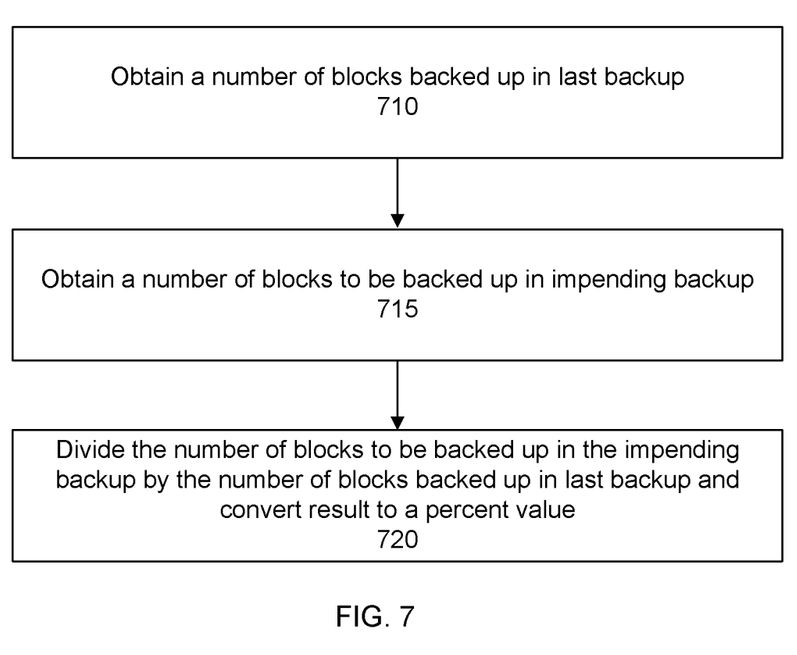
FIG. 7 shows a flow of a process for calculating a degree of change, under some embodiments.

FIG. 7 shows an example of a flow for calculating the degree of change. In a step 710, a number of blocks backed up in a last backup of the source is obtained. In a step 715, a number of blocks that have changed since the last backup and to be backed up in the impending backup is obtained. One or both values may be obtained from the change tracker installed at the backup client, the backup catalog, or both. For example, the backup catalog may maintain and store as metadata, a number of blocks that were included in a particular backup. The client change tracker may track the number of blocks that have changed since a last backup.

In another specific embodiment, the change tracker may maintain a changed block bitmap or log identifying the change blocks. In this specific embodiment, a number of changed blocks may be obtained by counting the number of changed block entries in the log or examining the changed block bitmap and counting the number of blocks marked as having been changed.

In a step 720, the number of blocks to be backed up in the impending backup is divided by the number of blocks backed up in the last backup. The result is then converted to a percent value to calculate the backup change or percent of data change. For example, consider that a number of blocks backed up in the last backup was 100 (step 710) and the number of blocks to be backed up in the impending backup is 10 (step 715). In this example, the backup change is calculated as 10 percent (i.e., 10/100=10 percent).

Referring back now to FIG. 5, in a step 535, the one or more stored rules are evaluated against the calculated percent of data change of the source to determine which backup level should be selected. The evaluation may include, for example, identifying the source application to be backed up, retrieving the one or more rules associated with the identified source application, and comparing the calculated percent of data change with the data change criteria specified in the rules to determine which rule (and thus which backup level) to apply.

In a step 540, based on the evaluation, one of a full backup level or a non-full backup level is selected for the impending backup of the source. There can be two types of non-full backup levels including an incremental backup level and a differential backup level. Some source applications may provide support for both types of non-full backup levels (e.g., incremental backups and differential backups). Other source applications may provide support for only one type of non-full backup level. For example, incremental backups may be supported but differential backups may not be supported. Alternatively, differential backups may be supported but incremental backups may not be supported. Regardless, the system's rules are flexible and can be configured to accommodate backing up any source application using the available backup levels.

In a step 545, the source is backed up in according to the selected backup level. The selected backup level may be a full backup. The selected backup level may be a non-full backup such as an incremental backup or differential backup. The process then loops back 550 to step 525 so that steps 530-545 may be repeated for each subsequent backup of the source.

These systems and techniques allow the backup application to be aware of the type of backup to perform on the basis of the data change with respect to the last or previous backup. In an embodiment, there can be an initial full backup. For each subsequent backup, a data change rate is calculated with respect to the last backup. If the data change rate is relatively small, an incremental backup is performed. If the data change rate is somewhat greater, a differential backup is performed. If the data change rate is quite large, a full backup is performed.

In a specific embodiment, a method includes storing a rule specifying a threshold degree of change and a full backup level to be used when a degree of change exceeds the threshold; receiving an indication to perform a backup of a source; after the receiving the indication and before performing the backup, calculating a degree of change of the source since a last backup of the source; comparing the calculated degree of change to the threshold degree of change; if the calculated degree of change exceeds the threshold degree of change, performing the backup using the full backup level; and if the calculated degree of change falls below the threshold degree of change, performing the backup using a non-full backup level. An amount of data backed up using the non-full backup level may be less than an amount of data backed up using the full backup level. An amount of data backed up using the full backup level may be greater than an amount of data backed up using the non-full backup level.

In another specific embodiment, a method includes storing a rule specifying a threshold degree of change and a non-full backup level to be used when a degree of change falls below the threshold; receiving an indication to perform a backup of a source; after the receiving the indication and before performing the backup, calculating a degree of change of the source since a last backup of the source; comparing the calculated degree of change to the threshold degree of change; if the calculated degree of change falls below the threshold degree of change, performing the backup using the non-full backup level; and if the calculated degree of change falls exceeds the threshold degree of change, performing the backup using a full backup level.

Figure 8:
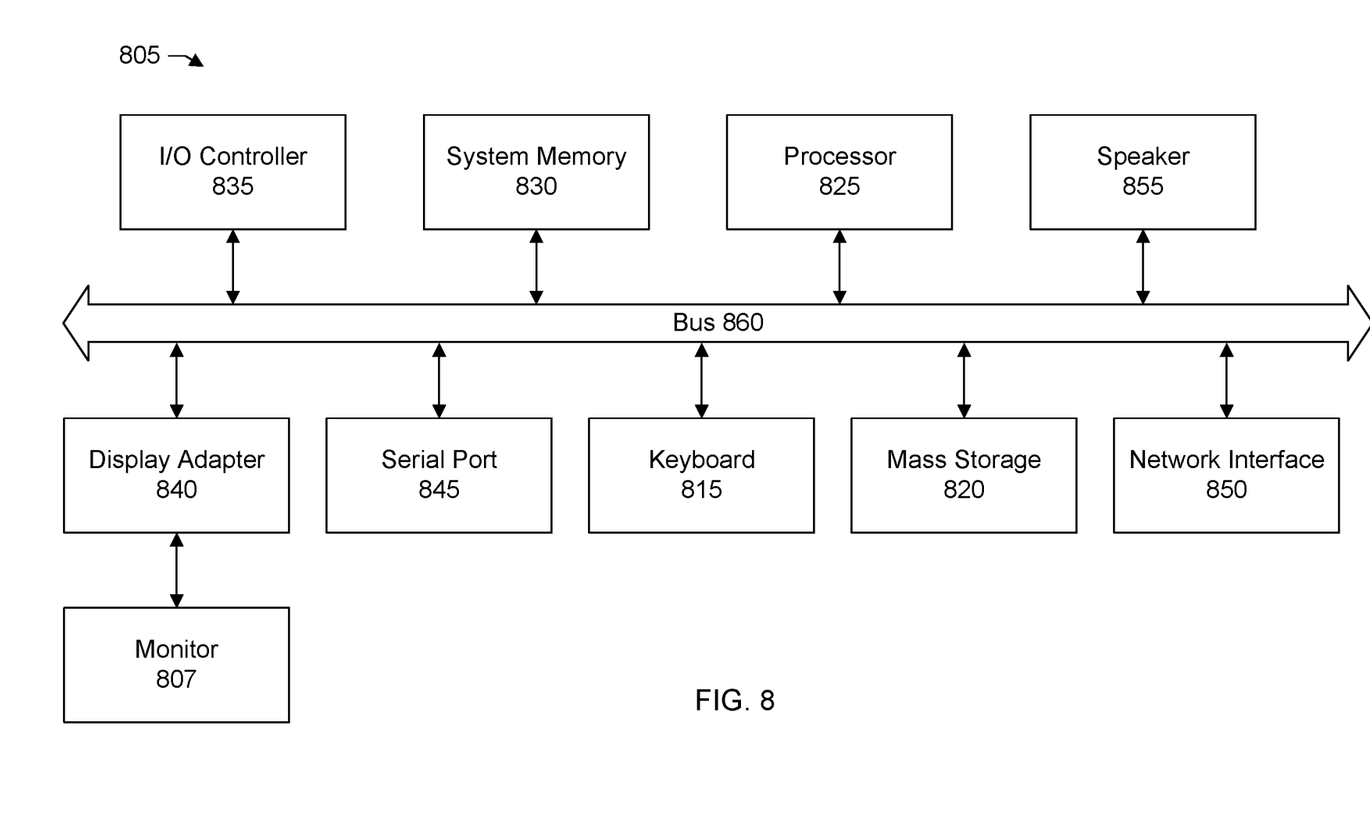
FIG. 8 shows a block diagram of a computer system suitable for use with the system, under some embodiments.

FIG. 8 shows a system block diagram of a computer system 805 used to execute the software of the present system described herein. The computer system includes a monitor 807, keyboard 815, and mass storage devices 820. Computer system 805 further includes subsystems such as central processor 825, system memory 830, input/output (I/O) controller 835, display adapter 840, serial or universal serial bus (USB) port 845, network interface 850, and speaker 855. The system may also be used with computer systems with additional or fewer subsystems. For example, a computer system could include more than one processor 825 (i.e., a multiprocessor system) or a system may include a cache memory.

Arrows such as 860 represent the system bus architecture of computer system 805. However, these arrows are illustrative of any interconnection scheme serving to link the subsystems. For example, speaker 855 could be connected to the other subsystems through a port or have an internal direct connection to central processor 825. The processor may include multiple processors or a multicore processor, which may permit parallel processing of information. Computer system 805 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method includes storing one or more rules, each rule comprising a data change percent, and a backup level to use corresponding to the data change percent, the backup level being one of a plurality of available backup levels, the plurality of available backup levels comprising a full backup level, and a non-full backup level; receiving, from a user, a decision to allow a backup level of a source to be selected dynamically; before backing up the source for an impending backup, calculating a percent of data change of the source from a last backup of the source to the impending backup; evaluating the one or more rules against the calculated percent change to select a backup level to use for the impending backup of the source; selecting, based on the evaluation, the full backup level or non-full backup level for the impending backup of the source; and backing up the source according to the selected backup level. A rule may include a range of data change percentages.

The non-full backup level may include an incremental backup or differential backup.

In an embodiment, a first rule specifies a first range of data change percentages, and the full backup level to be used when a calculated percent change falls within the first range, a second rule specifies a second range of data change percentages, and the non-full backup level to be used when the calculated percentage change falls within the second range, and each percent value in the first range is greater than each percent value in the second range.

Calculating a percent of data change may include obtaining a number of blocks backed up for the last backup; obtaining a number of blocks to be backed for the impending backup; dividing the number of blocks to be backed up for the impending backup with the number of blocks backed up for the last backup; and converting a result of the division to a percent to obtain the percent of data change.

In another specific embodiment, there is a system to select backup levels, the system comprising: a processor-based system executed on a computer system and configured to execute instructions comprising: storing one or more rules, each rule comprising a data change percent, and a backup level to use corresponding to the data change percent, the backup level being one of a plurality of available backup levels, the plurality of available backup levels comprising a full backup level, and a non-full backup level; receiving, from a user, a decision to allow a backup level of a source to be selected dynamically; before backing up the source for an impending backup, calculating a percent of data change of the source from a last backup of the source to the impending backup; evaluating the one or more rules against the calculated percent change to select a backup level to use for the impending backup of the source; selecting, based on the evaluation, the full backup level or non-full backup level for the impending backup of the source; and backing up the source according to the selected backup level.

In another specific embodiment, there is a computer program product, comprising a non-transitory computer-readable medium having a computer-readable program code embodied therein, the computer-readable program code adapted to be executed by one or more processors to implement a method comprising: storing one or more rules, each rule comprising a data change percent, and a backup level to use corresponding to the data change percent, the backup level being one of a plurality of available backup levels, the plurality of available backup levels comprising a full backup level, and a non-full backup level; receiving, from a user, a decision to allow a backup level of a source to be selected dynamically; before backing up the source for an impending backup, calculating a percent of data change of the source from a last backup of the source to the impending backup; evaluating the one or more rules against the calculated percent change to select a backup level to use for the impending backup of the source; selecting, based on the evaluation, the full backup level or non-full backup level for the impending backup of the source; and backing up the source according to the selected backup level.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
installing one or more application-specific plugins with a backup application, the application-specific plugins comprising logic for interfacing and communicating with a respective application source to backup data of the respective application source;
storing one or more rules, each rule specifying an application source to which a rule applies and comprising a data change percent, and a backup level to use corresponding to the data change percent, the backup level being one of a plurality of available backup levels, the plurality of available backup levels comprising a full backup level, and a non-full backup level;
receiving, from a user, a decision to allow a backup level of a particular application source to be selected dynamically, the particular application source comprising a virtualization platform having a plurality of virtual machines (VMs);
intercepting, by a changed block tracker (CBT) driver, writes issued by the VMs to volumes associated with the VMs to record a listing of changed blocks on the volumes;
at an impending backup of the particular application source, issuing by an application specific-plugin for the virtualization platform, a request to a copy service provided by the virtualization platform for a snapshot of the volumes;
before backing up the particular application source for the impending backup, reviewing the listing of changed blocks recorded by the CBT driver and calculating a percent of data change of the particular application source from a last backup of the particular application source to the impending backup;
selecting, from among the one or more rules, rules that apply to the particular application source;
evaluating the selected rules against the calculated percent change to select a backup level to use for the impending backup of the particular application source;
selecting, based on the evaluation, the full backup level or non-full backup level for the impending backup of the particular application source; and
backing up the snapshot provided by the copy service of the particular application source according to the selected backup level.

2. The method of claim 1 wherein a rule comprises a range of data change percentages.

3. The method of claim 1 wherein the non-full backup level comprises an incremental backup.

4. The method of claim 1 wherein the non-full backup level comprises a differential backup.

5. The method of claim 1 wherein a first rule specifies a first range of data change percentages, and the full backup level to be used when a calculated percent change falls within the first range,
wherein a second rule specifies a second range of data change percentages, and the non-full backup level to be used when the calculated percentage change falls within the second range, and wherein each percent value in the first range is greater than each percent value in the second range.

6. The method of claim 1 wherein the calculating a percent of data change comprises:
   obtaining a number of blocks backed up for the last backup;
   obtaining a number of blocks to be backed for the impending backup;
   dividing the number of blocks to be backed up for the impending backup with the number of blocks backed up for the last backup; and
   converting a result of the division to a percent to obtain the percent of data change.

7. A system to select backup levels, the system comprising:
   a processor-based system executed on a computer system and configured to execute instructions comprising:
   installing one or more application-specific plugins with a backup application, the application-specific plugins comprising logic for interfacing and communicating with a respective application source to backup data of the respective application source;
   storing one or more rules, each rule specifying an application source to which a rule applies and comprising a data change percent, and a backup level to use corresponding to the data change percent, the backup level being one of a plurality of available backup levels, the plurality of available backup levels comprising a full backup level, and a non-full backup level;
   receiving, from a user, a decision to allow a backup level of a particular application source to be selected dynamically, the particular application source comprising a virtualization platform having a plurality of virtual machines (VMs);
   intercepting, by a changed block tracker (CBT) driver, writes issued by the VMs to volumes associated with the VMs to record a listing of changed blocks on the volumes;
   at an impending backup of the particular application source, issuing by an application specific-plugin for the virtualization platform, a request to a copy service provided by the virtualization platform for a snapshot of the volumes;
   before backing up the particular application source for the impending backup, reviewing the listing of changed blocks recorded by the CBT driver and calculating a percent of data change of the particular application source from a last backup of the particular application source to the impending backup;
   selecting, from among the one or more rules, rules that apply to the particular application source;
   evaluating the selected rules against the calculated percent change to select a backup level to use for the impending backup of the particular application source;
   selecting, based on the evaluation, the full backup level or non-full backup level for the impending backup of the particular application source; and
   backing up the snapshot provided by the copy service of the particular application source according to the selected backup level.

8. The system of claim 7 wherein a rule comprises a range of data change percentages.

9. The system of claim 7 wherein the non-full backup level comprises an incremental backup.

10. The system of claim 7 wherein the non-full backup level comprises a differential backup.

11. The system of claim 7 wherein a first rule specifies a first range of data change percentages, and the full backup level to be used when a calculated percent change falls within the first range,
   wherein a second rule specifies a second range of data change percentages, and the non-full backup level to be used when the calculated percentage change falls within the second range, and
   wherein each percent value in the first range is greater than each percent value in the second range.

12. The system of claim 7 wherein the calculating a percent of data change comprises:
   obtaining a number of blocks backed up for the last backup;
   obtaining a number of blocks to be backed for the impending backup;
   dividing the number of blocks to be backed up for the impending backup with the number of blocks backed up for the last backup; and
   converting a result of the division to a percent to obtain the percent of data change.

13. A computer program product, comprising a non-transitory computer-readable medium having a computer-readable program code embodied therein, the computer-readable program code adapted to be executed by one or more processors to implement a method comprising:
   installing one or more application-specific plugins with a backup application, the application-specific plugins comprising logic for interfacing and communicating with a respective application source to backup data of the respective application source;
   storing one or more rules, each rule specifying an application source to which a rule applies and comprising a data change percent, and a backup level to use corresponding to the data change percent, the backup level being one of a plurality of available backup levels, the plurality of available backup levels comprising a full backup level, and a non-full backup level;
   receiving, from a user, a decision to allow a backup level of a particular application source to be selected dynamically, the particular application source comprising a virtualization platform having a plurality of virtual machines (VMs);
   intercepting, by a changed block tracker (CBT) driver, writes issued by the VMs to volumes associated with the VMs to record a listing of changed blocks on the volumes;
   at an impending backup of the particular application source, issuing by an application specific-plugin for the virtualization platform, a request to a copy service provided by the virtualization platform for a snapshot of the volumes;
   before backing up the particular application source for the impending backup, reviewing the listing of changed blocks recorded by the CBT driver and calculating a percent of data change of the particular application source from a last backup of the particular application source to the impending backup;
   selecting, from among the one or more rules, rules that apply to the particular application source;
   evaluating the selected rules against the calculated percent change to select a backup level to use for the impending backup of the particular application source;
   selecting, based on the evaluation, the full backup level or non-full backup level for the impending backup of the particular application source; and backing up the particular application source according to the selected backup level.

14. The computer program product of claim 13 wherein a rule comprises a range of data change percentages.

15. The computer program product of claim 13 wherein the non-full backup level comprises an incremental backup.

16. The computer program product of claim 13 wherein the non-full backup level comprises a differential backup.

17. The computer program product of claim 13 wherein a first rule specifies a first range of data change percentages, and the full backup level to be used when a calculated percent change falls within the first range,
- wherein a second rule specifies a second range of data change percentages, and the non-full backup level to be used when the calculated percentage change falls within the second range, and
- wherein each percent value in the first range is greater than each percent value in the second range.

18. The computer program product of claim 13 wherein the calculating a percent of data change comprises:
- obtaining a number of blocks backed up for the last backup;
- obtaining a number of blocks to be backed for the impending backup;
- dividing the number of blocks to be backed up for the impending backup with the number of blocks backed up for the last backup; and
- converting a result of the division to a percent to obtain the percent of data change.

* * * * *